United States Patent
Baxter et al.

(10) Patent No.: US 8,708,254 B2
(45) Date of Patent: Apr. 29, 2014

(54) SPRAYER WITH REMOTELY PIVOTABLE AND SELECTIVELY LOCKABLE NOZZLE

(75) Inventors: Brooke Baxter, Sherman, CT (US); William Raymond Bucknam, Woodbury, CT (US); Richard M. Farland, Sturbridge, MA (US); Corey Talbot, Hebron, CT (US)

(73) Assignee: Hyde Tools, Inc., Southbridge, MA (US)

( * ) Notice: Subject to any disclaimer, the term of this patent is extended or adjusted under 35 U.S.C. 154(b) by 418 days.

(21) Appl. No.: 12/800,012

(22) Filed: May 6, 2010

(65) Prior Publication Data

US 2011/0017846 A1     Jan. 27, 2011

Related U.S. Application Data

(60) Provisional application No. 61/215,588, filed on May 7, 2009.

(51) Int. Cl.
*B05B 7/02*     (2006.01)
*B05B 15/06*    (2006.01)
*B05B 15/08*    (2006.01)

(52) U.S. Cl.
USPC ...... 239/532; 239/525; 239/587.5; 239/587.1

(58) Field of Classification Search
USPC ......... 239/525, 526, 532, 587.5, 587.6, 587.1
See application file for complete search history.

(56) References Cited

U.S. PATENT DOCUMENTS

| | | | | |
|---|---|---|---|---|
| 1,745,972 | A * | 2/1930 | Beck | 239/532 |
| 2,857,201 | A * | 10/1958 | Palmer | 239/281 |
| 6,540,163 | B1 * | 4/2003 | Huang | 239/587.5 |
| 6,685,115 | B1 * | 2/2004 | Hardin | 239/587.1 |
| 6,976,644 | B2 | 12/2005 | Troudt | |
| 2002/0134864 | A1 * | 9/2002 | Goodwin et al. | 239/532 |
| 2007/0170288 | A1 * | 7/2007 | Troudt et al. | 239/587.5 |

* cited by examiner

*Primary Examiner* — Justin Jonaitis
(74) *Attorney, Agent, or Firm* — Louis J. Franco; Law Office of Louis J. Franco

(57) ABSTRACT

A fluid sprayer includes a rigid fluid conduit with a conduit side wall extending along a conduit axis between open first and second conduit ends. The conduit side wall defines a fluid passage extending between the open first and second ends. A spray nozzle with a fluid-expulsion bore is connected to the second conduit end such that it can pivot about a nozzle-pivot axis that extends orthogonally to the conduit axis and such that fluid introduced into the first conduit end is expelled through the fluid-expulsion bore. A nozzle actuator is attached to the conduit for bi-directional rotation about an actuator-rotation axis having a component of spatial extension perpendicular to the conduit axis. The nozzle actuator and nozzle are mechanically linked so that rotation of the actuator causes the nozzle to pivot with respect to the conduit axis. A spray-angle selector rotates in tandem with the nozzle actuator and includes an angle-selection surface. A selector stop, with a base portion fixed relative to the fluid conduit, cooperatively engages the angle-selection surface to define a plurality of angular nozzle positions and provide resistance opposing pivotal movement out of each angular nozzle position.

4 Claims, 7 Drawing Sheets

SPRAYER WITH REMOTELY PIVOTABLE AND SELECTIVELY LOCKABLE NOZZLE

PROVISIONAL PRIORITY CLAIM

Priority based on Provisional Application Ser. No. 61/215,588 filed May 7, 2009, and entitled "SPRAYER WITH REMOTELY PIVOTABLE AND SELECTIVELY LOCKABLE NOZZLE" is claimed. Moreover, the entirety of the previous provisional application, including the drawings, is incorporated herein by reference as if set forth fully in the present application.

BACKGROUND

1. Field

Although not so limited in its utility or scope, embodiments of the present invention are particularly well suited for implementation in the spray-gun portions of pressure washers and paint sprayers.

2. Brief Description of an Illustrative Environment and Related Art

Sprayers and associated nozzles are configured for various purposes including the application of "atomized" paint and the washing of objects with water expelled at high velocity. Apparatus of the latter type are commonly referred to as "pressure washers." Pressure washers may be used to wash autos, homes and other objects or structures. There are occasions when the user of a typical pressure washer cannot position the nozzle at an angle sufficient for spraying the desired target. For instance, the user may wish to spray salt and sand out from under the wheel wells of an automobile to prevent corrosion. However, the handle or "wand" portion of a typical pressure washer is too large for the user to spray under the wheel well in the area directly above and to the outside of the automobile's tire. In other circumstances in which it is possible to achieve a desired spray angle, it may be dangerous to do so. For instance, when power washing a house, a user might ascend a ladder to spray around and above second-story windows and under eaves. When spraying such areas, the user may need to hold the handle and nozzle over his head. Moreover, in order to achieve an advantageous spray angle at which water sprayed under pressure strikes the target areas of the structure orthogonally thereto, the user may need to lean out and away from the structure while on the ladder. At best, such positions are uncomfortable, but the discomfort is frequently exceeded by the associated danger of losing one's balance and falling.

At least one spraying device is known to allow a user to adjust the spray orientation of a pivotable spray nozzle located at the distal end of an extension pole. More specifically, U.S. Pat. No. 6,976,644 to Troudt (hereinafter, the "644 patent" or "Troudt patent") is drawn to an "Extension Pole with Swivel Spray Nozzle." As explained in the abstract of the Troudt patent, "[a] spray nozzle mounts to an extension pole end in a swivel joint. A swivel nozzle base connects to the pole and a manifold swivelly couples the base to a swivel nozzle head such that pressurized fluid passing through the pole passes into the base, through the manifold, into the head and then out or an orifice in the head through a spray tip attached to the head at the orifice.... To effect head rotation..., a lever is attached to the head. To move the lever on the distal end of an extension pole, (the lever) is connected to a rod that runs between the lever and an actuator on the pole. Typically, the actuator comprises a grip around the pole that slides along the pole when exercised (sic) by an operator. A spray gun is normally attached to the pole proximal end with a trigger that regulates high-pressure fluid into the pole." In addition to versions in which the actuator is a grip disposed around the pole that can be linearly reciprocated in order to impart rotation of the distal nozzle, the Troudt patent does describe a version in which the actuator is a pivoting handle grip.

While implementations of the Troudt device may alleviate accessibility and angling difficulties previously described, sprayers fabricated in general accordance with the teachings of the '644 patent have heretofore exhibited undesired nozzle rotation. More specifically, when a user moves the proximate actuator to rotate the nozzle to a desired angle, and then squeezes the trigger in order to spray pressurized fluid, the nozzle can move, thereby changing the original spray orientation. Another difficulty encountered by users of some embodiments constructed in accordance with the '644 patent is that, while a user might attempt to hold the slidable or rotatable actuator in a fixed position in order to resist nozzle rotation, this can prove difficult for some users when the trigger is squeezed and fluid is permitted to flow. More specifically, for example, in a version in which the actuator is also a handgrip, a user, in an attempt to counter recoil and thrust once pressurized fluid is flowing, unintentionally imparts movement to the actuator and, thereby, an undesired change in the spray angle of the rotatable nozzle.

Accordingly, in association with a sprayer having a remotely rotatable spray nozzle, including a version constructed in accordance with the teachings of Troudt, there exists a need for apparatus that counter undesired changes in the orientation of the spray nozzle, and that furthermore allow a user to selectively set the nozzle in each of a predetermined plurality of predefined angular positions.

SUMMARY

In each of various alternative embodiments, a sprayer for spraying pressurized fluids (i.e., liquids, gases or liquid/gas mixtures) includes a rigid fluid conduit extending along a conduit axis between longitudinally opposed first and second conduit ends. A conduit side wall has an exterior surface and an interior surface defining an internal fluid passage that extends between the first and second conduit ends. The first and second conduit ends include, respectively, a fluid-entrance opening through which fluid can be introduced into the fluid channel and a fluid-exit opening through which fluid can exit the fluid channel.

Attached to the second conduit end is a spray nozzle including a nozzle housing with opposed fluid-entrance and fluid-expulsion bores. An interior fluid channel for rendering the fluid-entrance and fluid-expulsion bores in mutual fluid communication extends longitudinally through the nozzle housing along a fluid-channel axis. The nozzle housing is connected to the second end of the fluid conduit with the internal and interior fluid channels in fluid communication such that pressurized fluid introduced into the fluid conduit through the fluid-entrance opening passes through the internal fluid passage and the interior fluid channel for expulsion through the fluid-expulsion bore of the nozzle housing. Moreover, the nozzle housing is connected to the second end of the fluid conduit for pivotal movement about a nozzle-pivot axis having a component of spatial extension orthogonal to each of the conduit axis and the fluid-channel axis such that the angular orientation of the fluid-channel axis relative to the conduit axis can be altered in order to change the spray angle at which fluid is expelled through the fluid-expulsion bore.

In each of various versions, the nozzle housing is connected to the conduit via a pivotable connector assembly including a first connector portion connected to the second conduit end and a second connector portion that retains the nozzle housing. The first connector portion includes a first-portion fluid passage that is in fluid communication with the internal fluid passage of the fluid conduit and the second connector portion includes a second-portion fluid passage that is in fluid communication with the interior fluid channel of the nozzle housing. The first-portion and second-portion fluid passages are rendered in mutual fluid communication through a manifold including a manifold fluid pathway extending transversely to the conduit and fluid-channel axes and between the first and second connector portions. In such versions, the manifold defines the nozzle-pivot axis, which will typically extend through the center of the manifold fluid pathway.

A nozzle actuator is affixed to the fluid conduit for reciprocable (e.g. bi-directional) rotation about an actuator-rotation axis having a component of spatial extension orthogonal to the conduit axis. More specifically, while in one illustrative version the actuator-rotation axis is oriented at an angle of 90° relative to the conduit axis, in alternative versions the actuator-rotation axis, although non-parallel to the conduit axis, is oriented at an angle of less than 90° relative to the conduit axis. It will be readily appreciated that when the actuator-rotation axis is oriented at any angle greater than 0° and less than 90° relative to the conduit axis, the actuator-rotation axis necessarily has "a component of spatial extension orthogonal to the conduit axis." Analogous terminology is used elsewhere in the current summary, the detailed description, and the claims, and the scope of such analogous language is to be interpreted with a breadth commensurate with the breadth attributed above to the language "component of spatial extension orthogonal to the conduit axis." Moreover, "extending orthogonally," and analogous terminology, is to be interpreted as broadly as indicated above in association with an orthogonal component of spatial extension.

A mechanical drive linkage mutually links the nozzle actuator and the nozzle housing such that rotation of the nozzle actuator about the actuator-rotation axis causes the spray nozzle to pivot about the nozzle-pivot axis. In at least one illustrative version, the mechanical linkage is in the form of a drive rod including proximal and distal ends and being fabricated from a material of sufficient rigidity to impart a pivoting force to the nozzle housing under each of (i) compression and (ii) tension. While a rod-type linkage is particularly advantageous, embodiments employing alternative linkage members are within the scope and contemplation of the invention as defined in the appended claims including, by way of non-limiting example, an embodiment incorporating an endless flexible linkage member such as a belt, band, chain or cable that invariably communicates a pivoting force under tension, regardless of the direction of actuator rotation.

In various alternative versions employing a rod-type linkage, the distal end of the rod is connected to a nozzle lever that depends from one of (i) the nozzle housing, (ii) the second connector portion, and (iii) a portion of the manifold carrying the second connector portion. In any of these illustrative configurations, the distal end of the rod is regarded as linked to the nozzle housing as long as compressive or tensile movement of the rod communicates torque to the nozzle lever and, thereby, pivots the nozzle. It will be readily appreciated that the location of attachment between the distal end of the drive rod and the nozzle lever is offset from the nozzle-pivot axis in order that torque may be selectively applied to the lever through the drive rod. In an analogous manner, the proximal end of the drive rod is connected to an actuator lever at an attachment location that is offset relative to the actuator-rotation axis, and which furthermore moves in tandem with, or otherwise in response to, the rotation of the actuator about the actuator-rotation axis.

In order to obviate undesired pivoting of the nozzle housing, each of various embodiments incorporates a spray-angle selector that facilitates the selective retention of the nozzle housing in various alternative angular nozzle positions relative to the fluid conduit. In each of various versions, the spray-angle selector is situated for rotational movement in tandem with the nozzle actuator and has an angle-selection surface. The angle-selection surface cooperates with a selector stop having a base portion positionally fixed relative to the fluid conduit and a selector-engaging portion configured to cooperatively engage (e.g., "mesh" or "selectively interfere" with) the angle-selection surface in order to define a plurality of angular nozzle positions and provide resistance against pivotal movement of the nozzle. In one illustrative version, the angle-selection surface includes a plurality of localized recesses mutually spaced along a circular arc centered about the actuator-rotation axis. The angle-selection surface cooperates with a selector stop having a recess-engaging portion that is selectively displaceable between first and second positions in which the recess-engaging portion, respectively, (i) engageably protrudes into one and (ii) does not protrude into any of the recesses of the spray-angle selector.

In at least one embodiment, the recess-engaging portion is normally biased by a recess-engaging force toward the recess-engaging position so as to impart resistance against rotation of the nozzle actuator from a position in which the recess-engaging portion protrudes into one of the recesses to a position in which the recess-engaging portion does not protrude into one of the recesses. It will be readily appreciated that, by virtue of the mechanical linkage between the nozzle housing and the nozzle actuator, resistance to the rotation of the nozzle-actuator translates to resistance against the unintended rotation of the nozzle and, thus, the spray angle. It will furthermore be appreciated that each recess corresponds to a unique angular orientation of the nozzle relative to the fluid conduit.

In one version, the recess-engaging portion of the selector stop can be selectively flexed out of a recess-engaging position by a user's applying to the spray-angle selector a torque of sufficient magnitude to overcome the recess-engaging force. Such versions are designed such that the applied torque required to displace the recess-engaging portion is of a magnitude larger than a torque typically applied unintentionally by the user in holding and controlling the sprayer.

Representative embodiments are more completely described and depicted in the following detailed description and the accompanying drawings.

DETAILED DESCRIPTION

The following description of variously embodied fluid sprayers is demonstrative in nature and is not intended to limit the invention or its application of uses. Accordingly, the various implementations, aspects, versions and embodiments described in the summary and detailed description are in the nature of non-limiting examples falling within the scope of the appended claims and do not serve to define the maximum scope of the claims.

Figure 1:
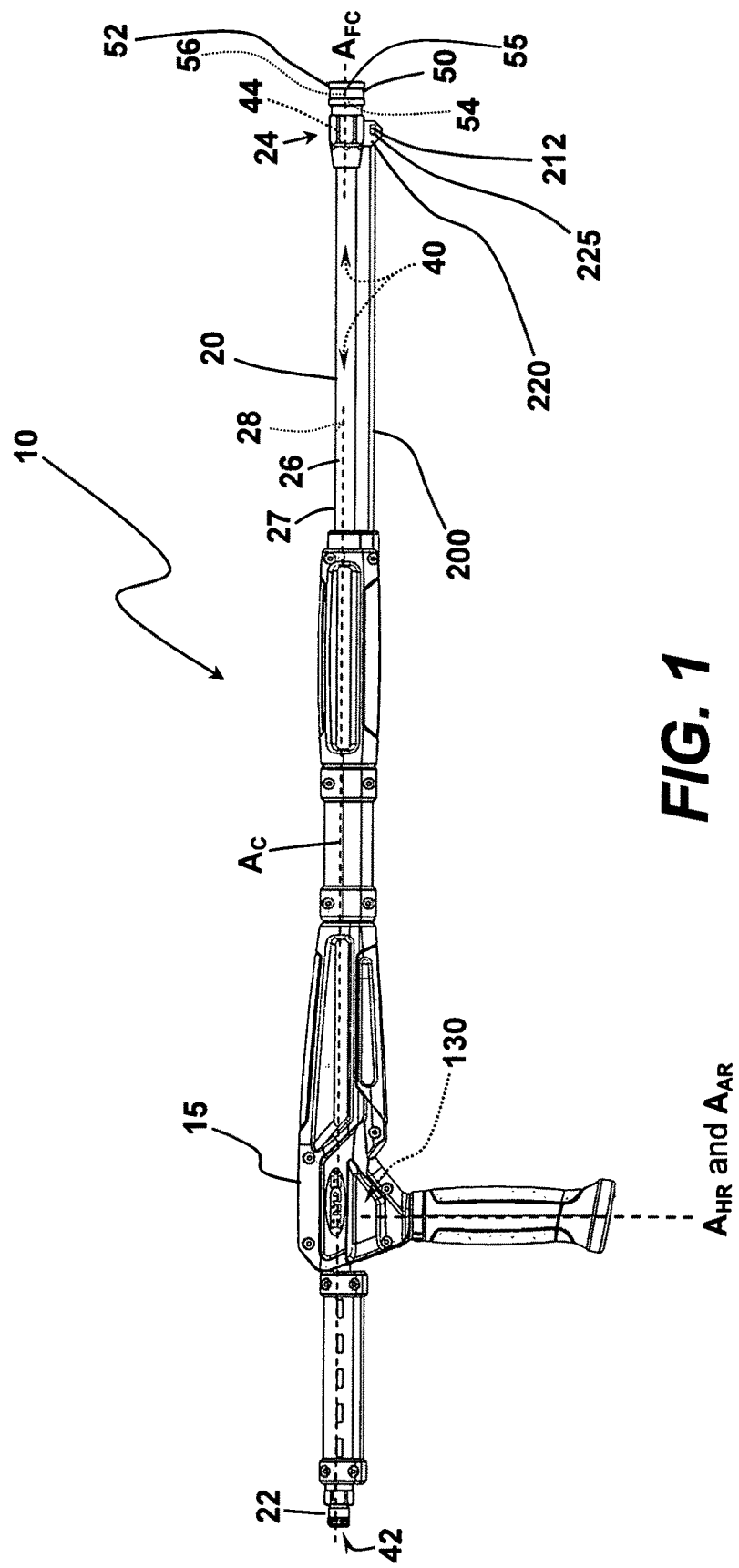
FIG. 1 is a right side view of an illustrative fluid sprayer.

Referring to FIG. 1, an illustrative sprayer 10 includes a rigid fluid conduit 20 that extends along a conduit axis $A_C$ between longitudinally opposed first and second conduit ends 22 and 24. A conduit side wall 26 has an exterior surface 27 and an interior surface 28 defining an internal fluid passage 40 that extends between the first and second conduit ends 22 and 24. The first and second conduit ends 22 and 24 include, respectively, a fluid-entrance opening 42 through which fluid can be introduced into the fluid passage 40 and a fluid-exit opening 44 through which fluid can exit the fluid passage 40.

With continued reference to FIG. 1, a spray nozzle 50 is attached to the second conduit end 24. The spray nozzle 50 has a nozzle housing 52 with opposed fluid-entrance and fluid-expulsion bores 54 and 55. An interior fluid channel 56 renders the fluid-entrance and fluid-expulsion bores 54 and 55 in mutual fluid communication and extends longitudinally through the nozzle housing 52 along a fluid-channel axis $A_{FC}$. The nozzle housing 52 is connected to the second conduit end 24 with the fluid passage 40 and fluid channel 56 in fluid communication such that pressurized fluid introduced into the fluid-entrance opening 42 of the fluid conduit 20 passes through the fluid passage 40 and the fluid channel 56 for expulsion through the fluid-expulsion bore 55 of the nozzle housing 52.

Figure 2:
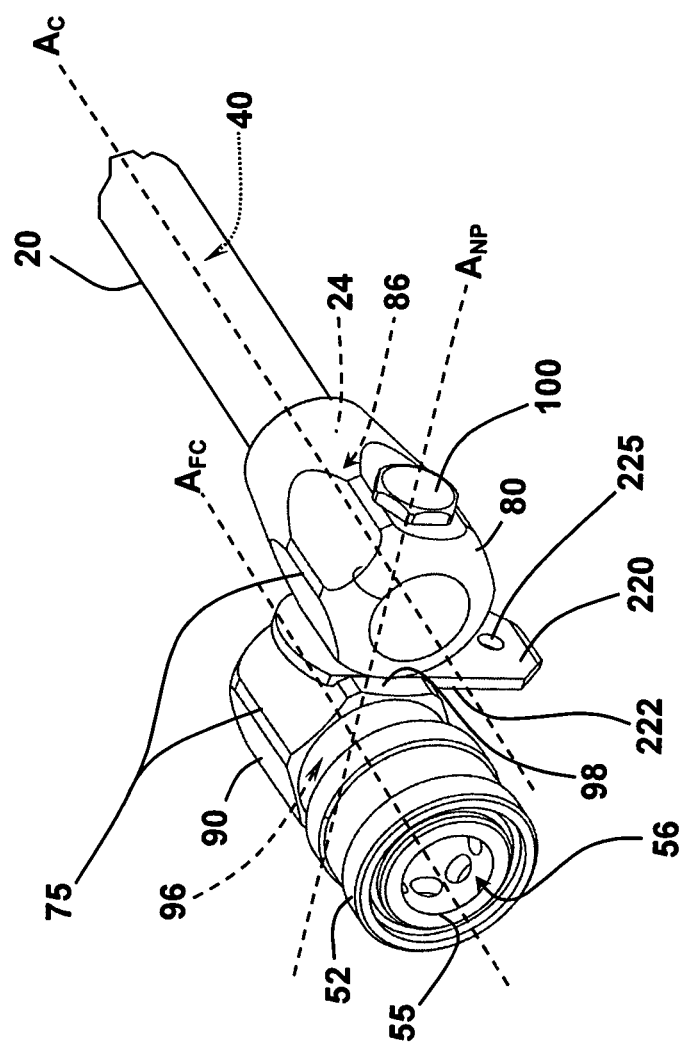
FIG. 2 shows the components of a pivotable connector assembly through which a nozzle is attached to a rigid fluid conduit.
Figure 2A:
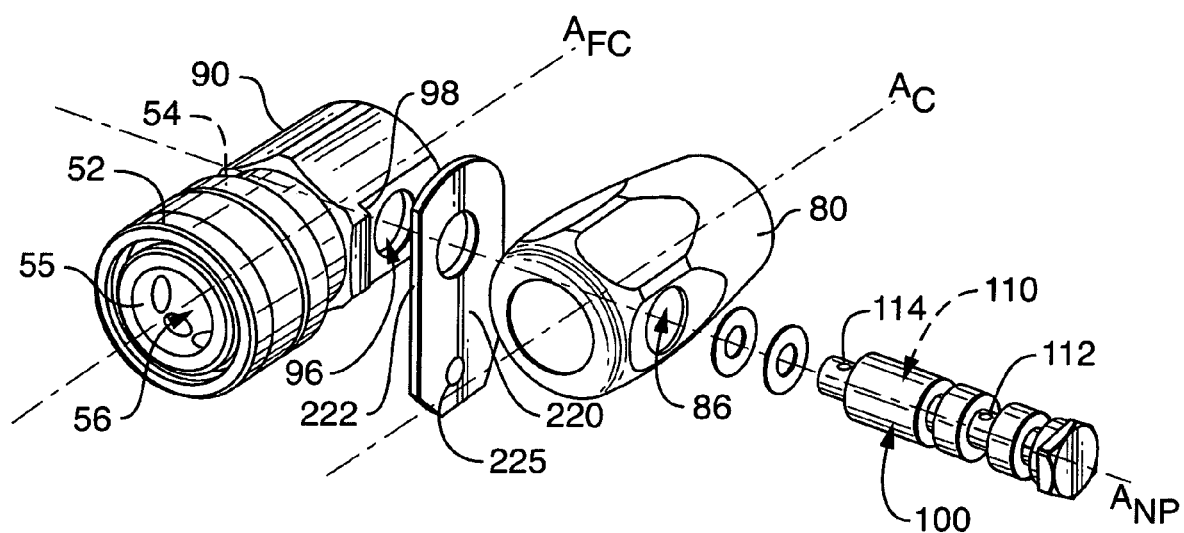
FIG. 2A is an exploded view of the components shown in FIG. 2.

As described in the summary, the nozzle housing 52 is attached to the second conduit end 24 for pivotal movement about a nozzle-pivot axis $A_{NP}$ having a component of spatial extension perpendicular to each of the conduit axis $A_C$ and the fluid-channel axis $A_{FC}$ such that the angular orientation of the fluid-channel axis $A_{FC}$ relative to the conduit axis $A_C$ can be changed. Illustrative components facilitating pivotal displacement of the nozzle housing 52 relative to the fluid conduit 20 are shown in FIG. 2 and FIG. 2A, the latter being an exploded view of the components shown in FIG. 2. More specifically, depicted in FIGS. 2 and 2A is a pivotable connector assembly 75 that includes first and second connector portions 80 and 90. The first connector portion 80 is connected to the second conduit end 24 and includes a first-portion fluid passage 86 that is in fluid communication with the fluid passage 40 of the fluid conduit 20. In one version, the first connector portion 80 and the second conduit end 24 are mutually connected by mutually cooperating threads (not shown). The second connector portion 90 retains the nozzle housing 52 and includes a second-portion fluid passage 96 that is in fluid communication with the fluid channel 56 of the nozzle housing 52. In one version, the connection between the second connector portion 90 and the nozzle housing 52 is via threads; however, in an alternative version, the connection is through a "quick-connect" mechanism of a type generally know to those of ordinary skill in the art and encountered commonly in association with garden hoses, air compressor fittings, and the like. Neither threads nor a quick-connect mechanism is shown because (i) both are widely known and, more to the point, (ii) the particular manner of connection between the pivotable connector assembly 75 and the nozzle housing 52 at one end, and the fluid conduit 20 at the other end, is of no particular relevance to the inventive aspects of the present invention.

The first-portion and second-portion fluid passages 86 and 96 are rendered in mutual fluid communication through a manifold 100 including a manifold fluid pathway 110 extending transversely between the first and second connector portions 80 and 90 and having a manifold first port 112 rendering the fluid pathway 110 in fluid communication with the first-portion fluid passage 86 and a manifold second port 114 rendering the fluid pathway 110 in fluid communication with the second-portion fluid passage 96. In the illustrative version of FIGS. 2 and 2A, the manifold 100 is a generally cylindrical body and defines a nozzle-pivot axis $A_{NP}$ that extends through the center of the manifold fluid pathway 110.

Figure 3:
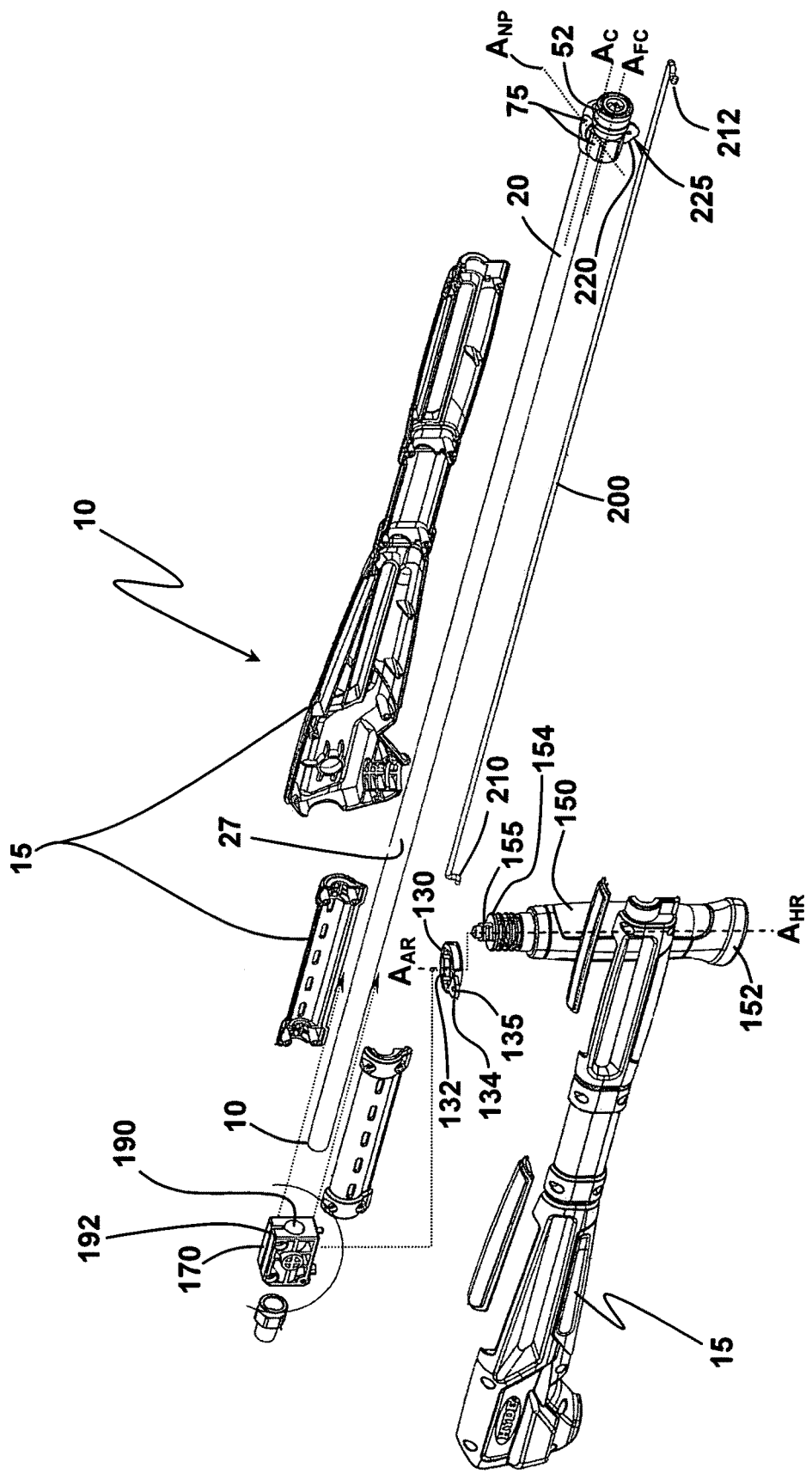
FIG. 3 is an exploded view of a fluid sprayer.

Illustrative mechanisms by which the nozzle housing 52 is remotely pivoted about the nozzle-pivot axis $A_{NP}$ are described with initial reference to FIG. 3, which is an exploded view of a sprayer 10, such as the sprayer 10 shown in FIG. 1, in which certain components hidden within a cowling or sprayer housing 15 in FIG. 1 are revealed. Included among the components shown in FIG. 3 is a nozzle actuator 130 that is attached to the fluid conduit 20 for reciprocable rotation about an actuator-rotation axis $A_{AR}$ having a component of spatial extension orthogonal to the conduit axis $A_C$. In the particular version of FIG. 3, the nozzle actuator 130 is carried by a elongated handle 150, which handle 150 is itself attached to the fluid conduit 20 for reciprocable rotation about a handle-rotation axis $A_{HR}$ having a component of spatial extension orthogonal to the conduit axis $A_C$, and along which the handle 150 longitudinally extends. More specifically, with additional reference to FIG. 5A, the handle 150 has a handle bottom end 152 and a longitudinally opposed handle top end 154 with a keyed protrusion 155 extending upwardly therefrom. The nozzle actuator 130 includes a central keyed opening 132 configured to insertably receive the keyed protrusion 155 of the handle 150 such that, when the handle 150 is rotated about the handle-rotation axis $A_{HR}$, the nozzle actuator 130 is rotated about the actuator-rotation axis $A_{AR}$. It will be readily appreciated that, in versions in which the handle 150 and nozzle actuator 130 cooperate as described above and shown in FIGS. 3 and 5A, for example, the actuator-rotation axis $A_{AR}$ and the handle-rotation axis $A_{HR}$ are one and the same, or "coaxial."

Figure 4A:
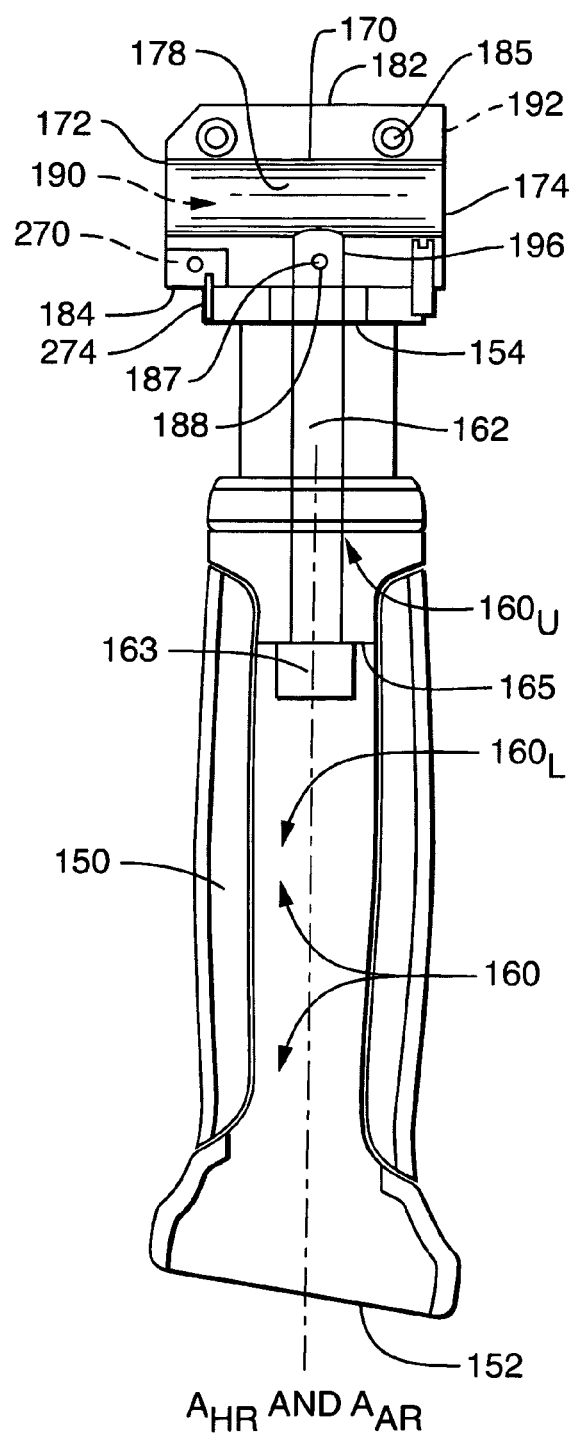
FIG. 4A is a right side, semi-phantom view of the mechanical connection between a handle and a mounting block that affixes the handle to the rigid fluid conduit of a fluid sprayer.
Figure 4B:
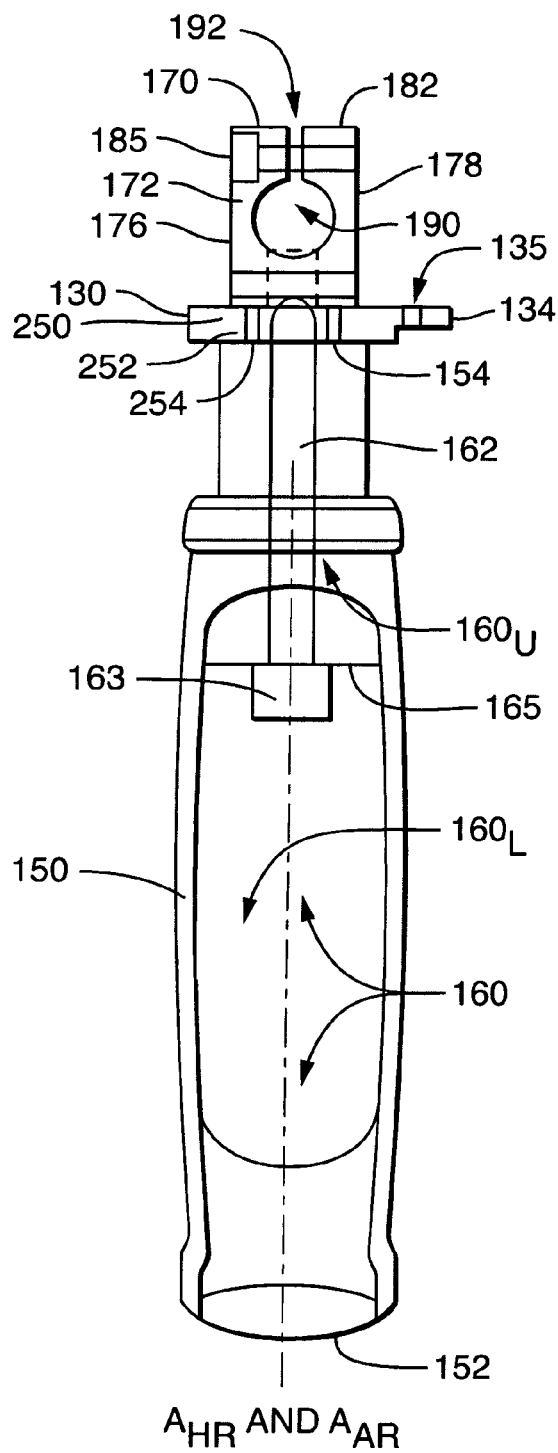
FIG. 4B is a semi-phantom rear view of the components shown in FIG. 4A.

With continued reference to FIG. 3, and additional reference to FIGS. 4A and 4B, the handle 150 is mounted to the fluid conduit 20 through a mounting block 170. The mounting block 170 has rear and front ends 172 and 174, and, extending between the rear and front ends 172 and 174, left, right, top and bottom sides 176, 178, 182 and 184. A conduit-receiving channel 190 extends between and through the rear and front ends 172 and 174 and is configured to insertably receive and retain the fluid conduit 20. In alternative versions, the fluid conduit 20 is held in place within the mounting block 170 by at least one threaded fastener 185 such as a bolt or screw. In one version, which is not shown, at least one set screw is threaded into the mounting block 170 and against the exterior surface 27 of the conduit side wall 26. In the illustrative version depicted in FIGS. 3, 4A and 4B, however, a constriction slot 192 is defined between the rear and front ends 172 and 174, and the conduit-receiving channel 190 and top side 182, of the mounting block 170. After the conduit 20 is slid into the desired position within the conduit-receiving channel 190, at least one threaded fastener 185 (e.g. screw) is tightened in order to draw toward one another those portions of the left and right sides 176 and 178 between which the constriction slot 192 and the conduit-receiving channel 190 extend. It will be appreciated that the drawing of the left and right sides 176 and 178 toward one another constricts the fluid conduit 20 within the conduit-receiving channel 190.

In order to attach the handle to the mounting block 170, and thus the fluid conduit 20, an illustrative handle 150, as shown in FIGS. 3, 4A and 4B, for example, has a mounting channel 160 extending between and through the handle bottom end 152 and a central portion of the keyed protrusion 155 (see FIGS. 3 and 5A) that extends upwardly from the handle top end 154. The mounting channel 160 is configured to receive an elongated handle-mounting rod 162 having, at one end thereof, an enlarged rod head 163. The mounting channel 160 is internally configured with a stepped shoulder 165 defined between upper and lower channel portions $160_U$ and $160_L$. The upper channel portion $160_U$ is of a smaller diameter than the lower channel portion $160_L$ such that the entirety of the handle-mounting rod 162 can be inserted into the mounting channel 160 through the handle bottom end 152, while the rod head 163 is prevented from entering the upper channel portion $160_U$ by the stepped shoulder 165. The length of the handle-mounting rod 162 is greater than the length of the upper channel portion $160_U$ such that, when the mounting rod 162 is fully inserted into the handle 150, a portion of the mounting rod 162 protrudes out of the keyed protrusion 155 on the handle top end 154.

Defined in the bottom side 184 of the mounting block 170 is a rod-receiving bore 196 that is configured to receive and retain at least a portion of the handle-mounting rod 162 that protrudes out of the keyed protrusion 155. In one version, the protruding portion of the mounting rod 162 is provided with external threads (not shown) that threadably engage internal threads (not shown) defined in the rod-receiving bore 196. However, because it is desirable to prevent rotation of the mounting rod 162 relative to the mounting block 170, and instead allow the handle 150 to rotate about the mounting rod 162, various versions, including those depicted in the drawings, include a set screw 187 that extends through an internally-thread set-screw bore 188 in the mounting block 170 and bears against the mounting rod 162. Whether, in any particular version, the mounting rod 162 is permitted to rotate, it will be appreciated that the handle rotation axis $A_{HR}$ is defined by, and extends through the center of, the mounting rod 162.

Referring to FIGS. 1 and 3, a drive rod 200 mutually links the nozzle actuator 130 and the nozzle housing 52 such that rotation of the nozzle actuator 130 about the actuator-rotation axis $A_{AR}$ causes the nozzle housing 52 to pivot about the nozzle-pivot axis $A_{NP}$. More specifically, the drive rod 200 has proximal and distal rod ends 210 and 212. In the versions depicted in FIGS. 1 and 3, the distal rod end 212 is connected to a nozzle lever 220 that is mounted about the manifold 100 and situated between the first and second connector portions 80 and 90 of the pivotable connector assembly (see enlarged and exploded views of FIGS. 2 and 2A). As shown in FIGS. 2 and 2A, the nozzle lever 220 includes a bearing edge 222 that engages a lip 98 defined on the second connector portion 90 such that pivoting of the nozzle lever 220 about the nozzle-pivot axis $A_{NP}$ causes the second connector portion 90 to pivot relative to the first connector portion 80, and thus the fluid conduit 20. The nozzle lever 220 and distal rod end 212 are mutually attached for pivotable motion relative to one another. In the versions depicted, this is accomplished by configuring the distal rod end 212 with at least one bend such that a portion of the distal rod end 212 has a component of extension perpendicular to the major extent of the drive rod 200. The bent distal rod end 212 is received through a distal-end receiving aperture 225 in the nozzle lever 220, which is in a location offset from the nozzle-pivot axis $A_{NP}$ so that torque can be selectively applied to the nozzle lever 220 through the drive rod 200.

In a manner analogous to the manner in which the distal rod end 212 and the nozzle lever 220 are mutually attached, the proximal rod end 210 is attached to an actuator lever 134 depending from, or otherwise mechanically communicative with, the nozzle actuator 130. More particularly, as shown in FIG. 3, the proximal rod end 210 is formed with at least one bend such that a portion of the proximal rod end 210 has a component of extension perpendicular to the major extent of the drive rod 200. The bent proximal rod end 210 is received through a proximal-end receiving aperture 135 in the actuator lever 134, which is in a location offset from the actuator-rotation axis $A_{AR}$ (shown in FIGS. 4B and 5A, in addition to FIG. 3). With the actuator lever 134 and the nozzle lever 220 mechanically linked as generally described and depicted, it will be readily appreciated that rotation of the handle 150 causes pivotal movement of the nozzle housing 52, thereby changing the spray angle relative to the conduit axis $A_C$.

Figure 5A:
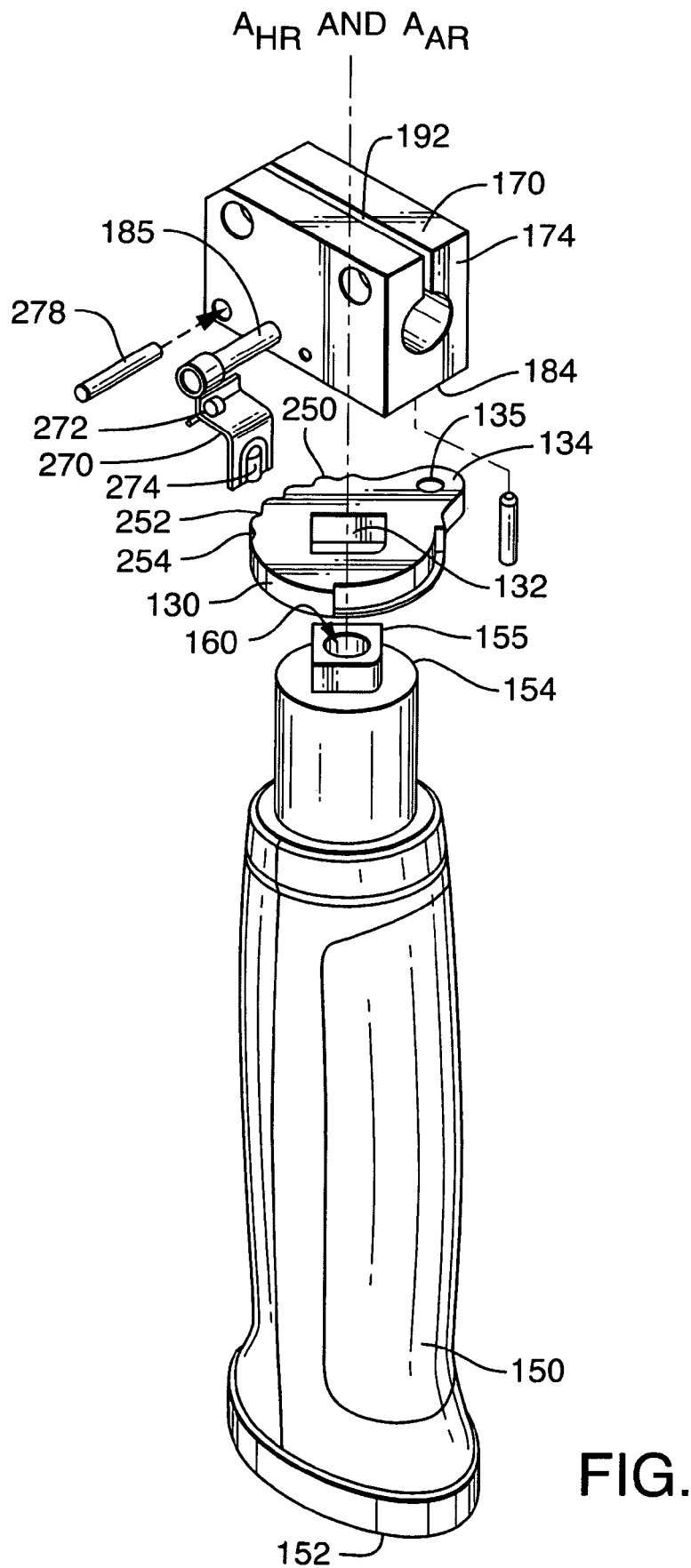
FIG. 5A is an exploded view showing selected components of an illustrative spray-angle selector for selectively retaining the spray nozzle of a sprayer in various predefined angular positions.
Figure 5B:
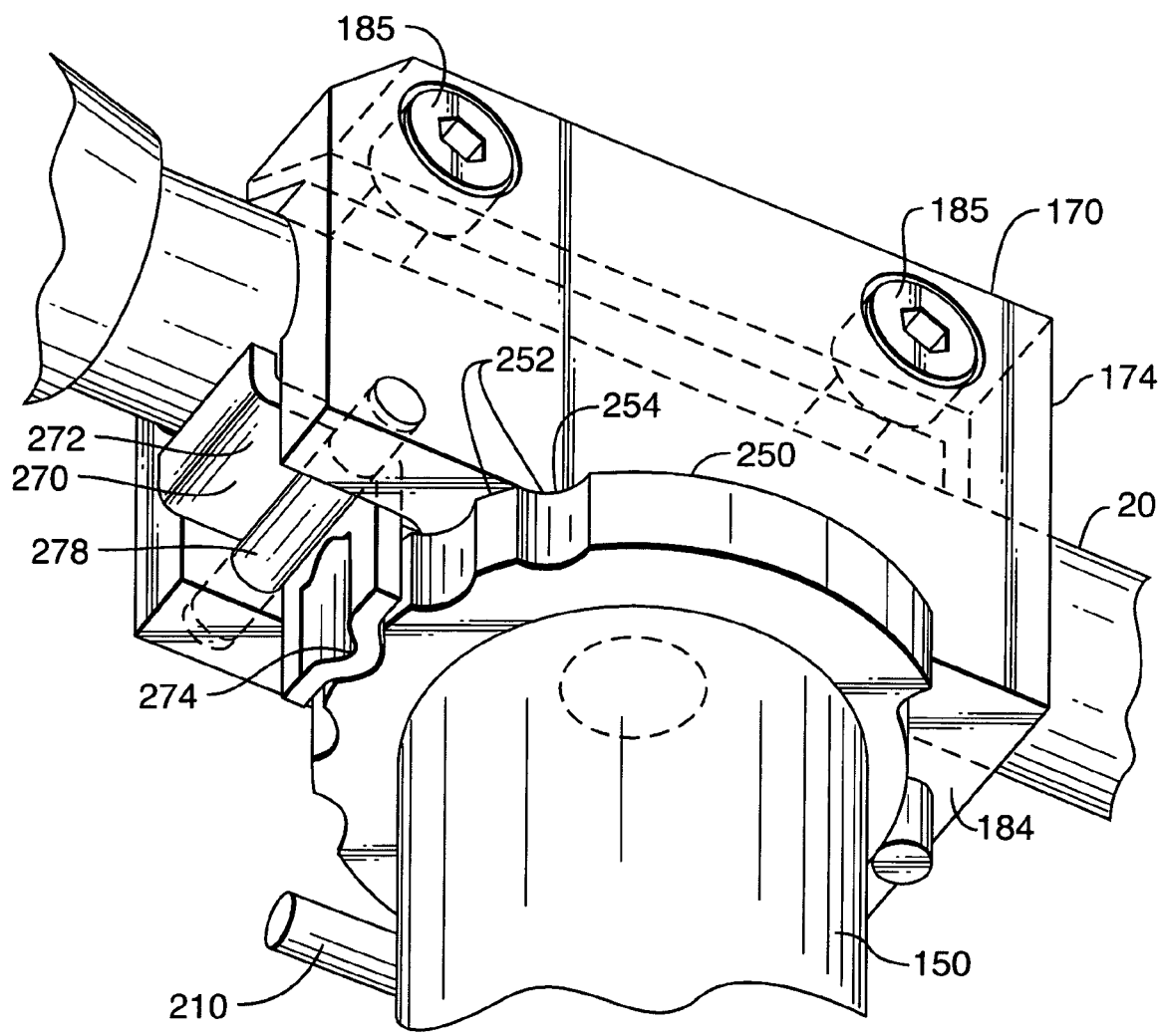
FIG. 5B shows an underside, semi-phantom view of assembled spray-angle selector components, such as those shown in the exploded view of FIG. 5A.

As described in the summary, and now with reference to FIGS. 4B, 5A and 5B, embodiments of the present invention incorporate a spray-angle selector 250 that facilitates the selective retention of the nozzle housing 52 in various pre-defined angular nozzle positions relative to the fluid conduit 20. In the illustrative versions depicted, the spray-angle selector 250 is situated for rotational movement in tandem with the nozzle actuator 130 and has an angle-selection surface 252 including a plurality of localized recesses 254 mutually spaced along a circular arc centered about the actuator-rotation axis $A_{AR}$. Moreover, in the versions depicted, the spray-angle selector 250 and the nozzle actuator 130 are formed as parts of single piece of material. However, in alternative versions, the spray-angle selector 250 is otherwise connected to or depends from the nozzle actuator 130. Accordingly, absent specific claims language to the contrary, versions in which the nozzle actuator 130 and spray-angle selector 250 are separate pieces are within the scope and contemplation of the invention as defined in the appended claims.

As shown most clearly in FIGS. 5A and 5B, the angle-selection surface 252 cooperates with a selector stop 270 having a base portion 272 and a recess-engaging portion 274 for alternatively and selectively engaging (e.g., meshing with) each of the recesses 254 forming a part of the angle-selection surface 252. More specifically, the recess-engaging portion 274 is selectively displaceable between first and second positions. In the first position, shown in FIG. 5B, the recess-engaging portion 274 engageably protrudes into one of the recesses 254 while, in the second position, the recess-engaging portion 274 is disengaged from the recesses 254 (i.e., does not protrude into any of the recesses 254). In various alternative embodiments, the recess-engaging portion 274 is normally biased by a recess-engaging force toward a recess-engaging position. By virtue of the mechanical linkage (drive rod 200) between the nozzle housing 52 and the nozzle actuator 130, the resistance to the rotation of the nozzle actuator 130 provided when the recess-engaging portion 274 protrudes into one of the recesses 254 translates into resistance opposing the unintended rotation of the nozzle housing 52 and the handle 150 because, as will be readily appreciated by the ordinarily-skilled person in the related art, the handle 150, the spray-angle selector 250 and the drive rod 200 are all interrelated components of the same "drive train" that controls movement and positional locking of the nozzle housing 52.

The mutually intermeshing portions of the selector stop 270 and the angle-selection surface 252 might assume various configurations and are to be interpreted broadly. For example, while the intermeshing portions have been described above primarily as a recess-engaging portion 274 of the selector stop 270 selectively protruding into recesses 254 of the angle-selection surface 252, it will be appreciated that the arrangement depicted can be equally described as the angle-selection surface 252 having a recess-engaging portion that selectively protrudes into recessed portions of the selector stop 270. More specifically, the material surrounding and defining each recess 254 in the angle-selection surface 252 can be thought of as protrusions—relative to the recesses 254—that protrude past the recess-engaging portion 274 of the selector stop 270 into portions of the selector stop 270 that are recessed relative to either side of the recess-engaging portion 274 thereof. Accordingly, arrangements characterized in accordance with this latter interpretation are not only expressly regarded as within the scope of the appended claims, but are also within the scope of the illustrative embodiments described above and depicted in the drawings.

In one set of versions employing a selector stop 270, the recess-engaging portion 274 can be displaced out of a recess-engaging position by a user's applying to the spray-angle selector 250 a torque sufficient in magnitude to overcome the recess-engaging force. With specific reference to the exploded view of FIG. 5A and the assembled, semi-phantom view of FIG. 5B, an illustrative selector stop 270 is fabricated from a resilient material such as metal or plastic. In the particular version of FIGS. 5A and 5B, the base portion 272 of the selector stop 270 is mounted to the bottom side 184 of the mounting block 170 and held in place by a stop-retaining pin 278, although it is to be understood that the manner in which the selector stop 270 is retained in position relative to the conduit 20 is of no particular relevance to the invention. When a torque of sufficient magnitude is applied to the handle 150, a portion of the selector stop 270 flexes, and the recess-engaging portion 274 is temporarily displaced from a recess-engaging position. As a next successive recess 254 is aligned with the recess-engaging portion 274, the recess-engaging portion 274 is biased into enmeshed engagement with the aligned recess 254. In this manner, the spray-angle selector 250 is "clicked" into various positions, each representing a particular angular disposition of the nozzle 50 relative to the conduit 20.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A fluid sprayer comprising:
    a rigid fluid conduit extending along a conduit axis between open first and second conduit ends;
    a nozzle having a fluid-expulsion bore and being connected to the second conduit end such that (i) the nozzle can pivot about a nozzle-pivot axis that extends orthogonally to the conduit axis and (ii) fluid introduced into the first conduit end is expelled through the fluid-expulsion bore;
    an elongated handle affixed to the fluid conduit for reciprocable rotation about a handle-rotation axis having a component of spatial extension orthogonal to the conduit axis and along which the handle longitudinally extends;
    a nozzle actuator carried by the handle for bi-directional rotation such that, when the handle is rotated about the handle-rotation axis, the nozzle actuator is rotated about an actuator-rotation axis that is co-axial with the handle-rotation axis;
    a mechanical linkage linking the nozzle actuator to the nozzle such that rotation of the nozzle actuator about the actuator-rotation axis causes the nozzle to pivot about the nozzle-pivot axis;
    a spray-angle selector depending from the nozzle actuator and having an angle-selection surface with a plurality of recesses mutually spaced along a circular arc for rotational movement about the actuator-rotation axis in tandem with the nozzle actuator; and
    a selector stop having a base portion positionally fixed relative to the fluid conduit and being configured to cooperatively engage the angle-selection surface in order to define a plurality of angular nozzle positions and provide resistance against pivotal movement of the nozzle.

2. The sprayer of claim 1 wherein
    the selector stop includes a recess-engaging portion that is selectively displaceable between a recess-engaging position in which the recess-engaging portion engageably protrudes into one of the recesses and a second position in which the recess-engaging portion does not protrude into any of the recesses of the spray-angle selector, the recess-engaging portion being normally biased toward the recess-engaging position so as to impart resistance against rotation of the nozzle actuator from a position in which the recess-engaging portion protrudes into one of the recesses to a position in which the recess-engaging portion does not protrude into one of the recesses.

3. The sprayer of claim 2 wherein the mechanical linkage linking the nozzle actuator and the nozzle is a drive rod including proximal and distal ends and being sufficiently rigid to impart a pivoting force to the nozzle under each of compression and tension.

4. The sprayer of claim 1 wherein the mechanical linkage linking the nozzle actuator and the nozzle is a drive rod including proximal and distal ends and being sufficiently rigid to impart a pivoting force to the nozzle under each of compression and tension.

* * * * *